United States Patent
Rantsch

[15] 3,694,089
[45] Sept. 26, 1972

[54] DEVICE FOR DETERMINING GUIDANCE ERRORS

[72] Inventor: Kurt Rantsch, Heidenheim, Germany

[73] Assignee: Carl Zeiss-Stiftung, Oberkochen/Wuerttenberg, Germany

[22] Filed: Dec. 17, 1970

[21] Appl. No.: 99,220

[30] Foreign Application Priority Data

Dec. 23, 1969   Germany..........P 19 64 470.3

[52] U.S. Cl. ...................356/138, 356/152, 356/153
[51] Int. Cl........................G01b 21/46, G01b 11/26
[58] Field of Search......356/138, 139, 150, 172, 153, 356/246, 152

[56] References Cited

UNITED STATES PATENTS

| | | | |
|---|---|---|---|
| 3,603,691 | 9/1971 | Hamilton | 356/172 |
| 3,378,326 | 4/1968 | Alvarez | 356/247 |

*Primary Examiner*—Ronald L. Wibert
*Assistant Examiner*—Conrad Clark
*Attorney*—Sandoe Hopgood and Calimafde

[57] ABSTRACT

In applications where a movable body is to be precisely displaced and oriented over a range of movement with respect to a relatively fixed body, as for example, to maintain the movable body on a precise axial alignment (free of tilt and lateral offsets) over a range of axial displacement of the movable body, the invention contemplates a combination of optical systems, particularly afocal systems having imaging characteristics $\beta' = +1$ and $\beta' = -1$. These afocal systems include component elements so disposed on the moving and fixed bodies that wide-based fixed optical reference axes may be continuously observed and tracked.

The invention is described in the illustrative context (a) of a single-axis guided slide movement and (b) of a multiple-axis system, exemplified by the two-component motion of a machine-tool cross-slide on its main slide.

18 Claims, 20 Drawing Figures

DEVICE FOR DETERMINING GUIDANCE ERRORS

The invention concerns a device for determining the guidance errors (i.e., position and directional or orientation errors) of moving parts, particularly in machine tools or measuring machines.

In a longitudinal displacement of a slide from a given position in a direction determined by the construction, there are always five components of error for the actually attained position relative to the ideal position of the slide, due to unavoidable imperfections of the guide. These error components are:

1. Two position errors, corresponding to lateral and vertical offsetting displacement of the slide; and
2. Three direction errors, corresponding to the respective small rotational components of slide orientation, relative to a three-axis orthogonal reference system fixed in space. There has been no lack of proposals, using the comparator principle or using optical compensating elements in an effort to avoid or reduce the effect of these guidance errors on the precision of the result. For example, in an article in Optik 28, 1968/69, pp. 242 to 248, an optical coordinate-measuring instrument is shown in a cross-slide construction, wherein a partial rotation of the work table about an axis perpendicular to the plane of the displacement is effectively compensated (i.e., does not affect accuracy of certain measured values, in the particular coordinate system) if a point-wise transfer of the coordinate values is made from a scanning point optically referenced to the machine frame, and as long as the measuring plane is maintained at an elevation (above the machine frame) determined by the measuring system. However, such a device is of limited value in the present context, due to the indicated secondary considerations.

The primary object of the invention is to eliminate as far as possible the influence of guidance errors, both in their effect and in their cause. To this end, it is necessary to make the guidance errors easily recognizable and continuously determinable. It is also an object to achieve the foregoing object with a system of general application, for a variety of purposes.

According to the invention, these objects are achieved by equipping the moving part with discriminators having the capability of distinguishing magnitude and direction of movement. For example, a group of parallel (e.g., longitudinal) reference lines is optically established in the guide bed, said reference lines being parallel to the direction of displacement of the moving part, and the moving part is provided with discriminators which determine the true space position of the moving part with regard to these reference lines, for both position and directional components.

In a preferred embodiment, the moving part is displaceable between bed-mark reference systems arranged in the guide, and the moving part carries combinations of afocal imaging systems, with imaging characteristics $\beta'= +1$ and $\beta'= -1$, which imaging systems reproduce the marking systems one upon the other.

Thus, the position of the image of the afocal imaging system with an image scale of $\beta'= +1$ depends merely on the direction of its optical axis and is insensitive to a parallel displacement.

The position of the image of the system with an image scale of $\beta'=-1$, on the other hand, depends both on the direction and magnitude of the displacement of its optical axis from the original position.

Now, in use of a moving part thus equipped with both the above-mentioned types of afocal imaging systems, if we first employ the $(+1)\beta'$ system (i.e., the system with the image scale or characteristic $\beta'= +1$) as a direction discriminator to align the same with respect to a reference-mark system which has been established in accordance with the desired direction of movement, the other afocal system (image scale $\beta'= -1$) will only indicate magnitude of displacement, since directional influence has already been compensated by the afocal system with the image scale $\beta'=+1$.

Since the afocal imaging systems used have a constant object-image distance, the mark- or receiver systems necessary for the determination of position can be mounted in the guide bed in fixed spaced positions, between which the moving part together with its afocal imaging systems is displaced.

In principle, it is also possible, instead of mark-imaging through the afocal system with the image scale $\beta'= +1$, to use other direction discriminators which are composed, for example, of a collimator and a telescope; however, such practice involves locating at least one optical-imaging part, either the collimator or the telescope, on the guide bed, thus requiring for trouble-free operation that the guide bed shall not be subject to bending. Resulting system errors in the direction discriminator would otherwise degrade the precision and accuracy of the result.

In the above-mentioned mounting of the afocal imaging system in the moving part itself, only the mark systems are referenced in the guide bed, and these mark systems are set on straight optical axes, between spaced reference points. Thus, such bends as may occur when the frame or guide bed is under great load have far less influence on the precision of the result.

If the moving part is adjustable in each of several directional paths, corresponding afocal systems can be provided for each adjustment path. Also, it is self-evident, in machine tools, measuring machines and the like, that (apart from the slide) the guide for the work or for a measuring tool may be provided with such discriminators, sensitive to position and directional orientation.

The mark systems cooperating with the afocal imaging systems may consist, for example, of ruled plates (graticules or reticles) with lines extending perpendicular to the direction of motion of the moving part and parallel to the other coordinate directions. Also, for example, the graticules reproduced by the afocal systems on one another may contain single and double lines. With such a mark system, if desired, the invention lends itself merely to a determination of pre-existing guide-errors and the degree to which their cause may have been eliminated, through adjusting means acting on the moving part.

For determining the magnitude of the guidance errors, scales and index marks (analog determination) or raster marks (digital determination) are provided.

The error values thus ascertained permit a clear determination of the position of the moving object, as it will be shown.

The values obtained can be utilized for calculations if it is desired to continuously check the position of the displaceable part according to the numerical values. And if it is desired to automatically eliminate errors caused by the guide, the numerical values can also be used to control suitable adjusting means, acting on the guide or on the moving part itself.

Other details and features of the invention will be described more fully in connection with the accompanying drawings, in which.

Figure 1:
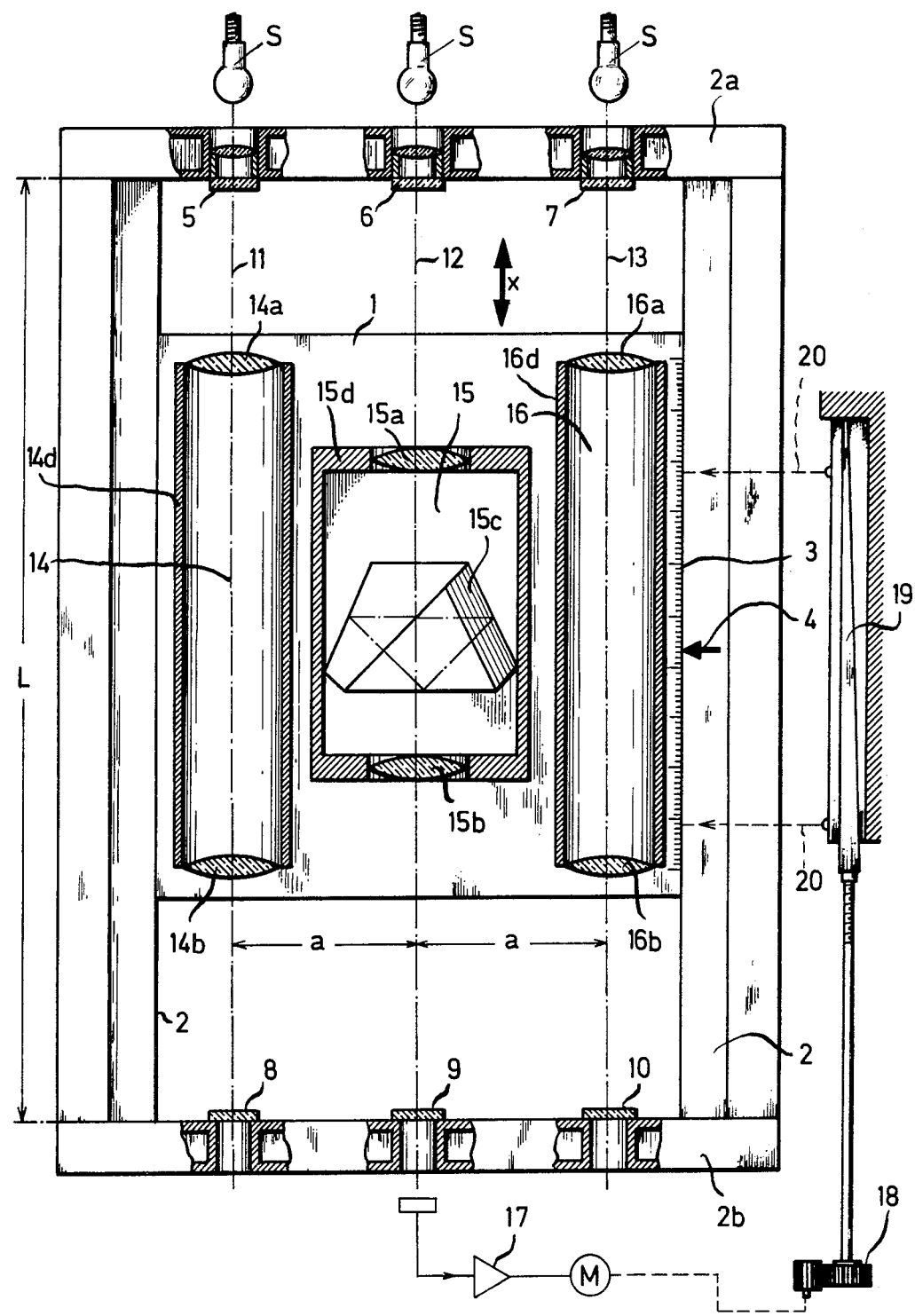
FIG. 1 is a simplified and somewhat schematic plan view of a slide and guide, to which an error-discriminating optical system of the invention has been applied.

In FIG. 1, the reference 1 denotes a slide which can be displaced in a guide bed, along ways 2, in the displacement direction $x$. The extent of the displacement can be read from a scale 3 on the slide 1, by means of a fixed index 4 on the guide bed. At the respective longitudinal ends of the guide bed or ways 2, transverse members or walls 2a–2b form part of the frame or guide-bed structure; the walls 2a–2b carry pickup-mark systems 5-6-7 and receiver-mark systems 8-9-10 which are respectively aligned to define three reference lines 11-12-13 extending parallel to the desired direction of motion; for the movable slide 1, the lines 11-12-13 represent a reference system fixed in the bed or frame.

The slide 1 carries three afocal imaging systems 14-15-16, of which the system 14 (lenses 14a and 14b) and system 16 (lenses 16a and 16b) have an image scale $\beta' = -1$, while system 15 (lenses 15a and 15b, and the interposed direct-viewing, image-erecting prism 15c) has an image scale $\beta' = +1$; the prism 15c may be, for example, a so-called Schmidt or Pechan system. The parts of these afocal imaging systems are, for example, combined in tubes 14d, 15d and 16d, which are in turn rigidly connected to slide 1.

The optical axes of the afocal imaging system 14-15-16 are parallel to each other and are aligned in the displacement direction $x$ so that they come to lie in the ideal case (i.e., assuming no guidance errors) exactly in the direction of the reference lines (11-12-13). The three afocal imaging systems 14-15-16 lie, for example, in a plane parallel to the surface of slide 1, and have the same distance $a$ from each other.

The mark systems 5-6-7, which may be illuminated, or which may be luminescent or self-illuminating, are reproduced at the respective receiver-mark systems 8-9-10, vertically and laterally inverted by the imaging systems 14 and 16, and laterally and vertically uninverted by imaging system 15.

The distance of the mark systems 5-6-7 from the mark systems 8-9-10 is designated L and corresponds to the constant object-image distance of the afocal imaging systems 14-14-16.

Figure 2A:
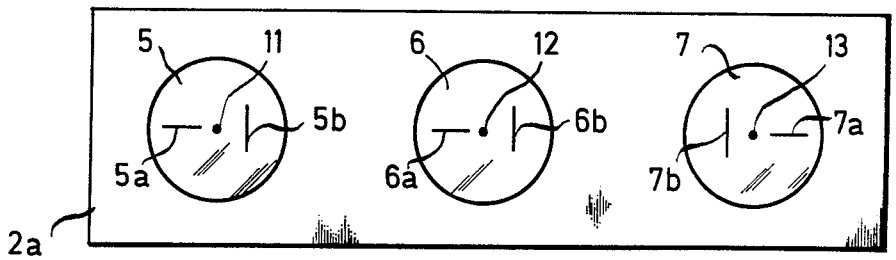
FIGS. 2a to 2d, 3a and 3b are views, on an enlarged scale and all viewed from the same aspect, to variously illustrate mark systems as used in the system of FIG. 1.
Figure 2B:
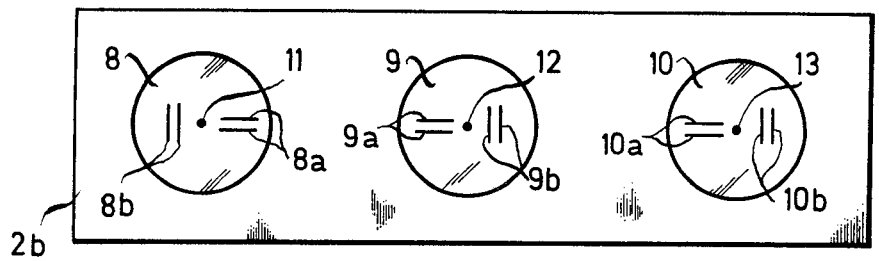

As shown in FIGS. 2a and 2b, the mark systems 5-6-7 and 8-9-10, respectively, may each comprise a graticule inscribed as lines in a plane perpendicular to the direction of the reference lines 11-12-13. The pickup-mark systems 5-6-7 (FIG. 2a) are inscribed with single horizontal lines 5a–6a–7a and with single vertical lines 5b–6b–7b, while the receiver-mark systems 8-9-10 (FIG. 2b) have corresponding pairs of horizontal parallel lines 8a–9a–10a and corresponding pairs of vertical parallel lines 8b–9b–10b. Axial registry of the mark systems of FIGS. 2a and 2b on and with respect to the optical reference axes is indicated by the respective axis designations 11-12-13.

Figure 2C:
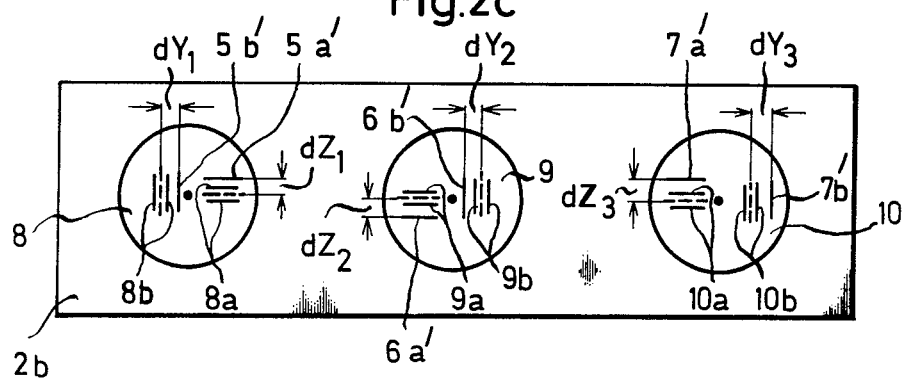

In use, the pickup-mark systems 5-6-7 are reproduced by the afocal imaging systems 14-15-16 on the corresponding and opposite receiver-mark systems 8-9-10, and there may be small deviations $dZ_1$-$dZ_2$-$dZ_3$ and $dY_1$-$dY_2$-$dY_3$ of the mark images $5a'$-$5b'$-$6a'$-$6b'$-$7a'$-$7b'$, from the ideal position represented by broken lines, as shown in FIG. 2c, depending on the position of slide 1 with respect to the reference lines 11-12-13. The broken-line or ideal placement of these images represents complete registry of the optical axes of the afocal imaging systems 14-15-16 with the directions of the reference lines 11-12-13.

Figure 2D:
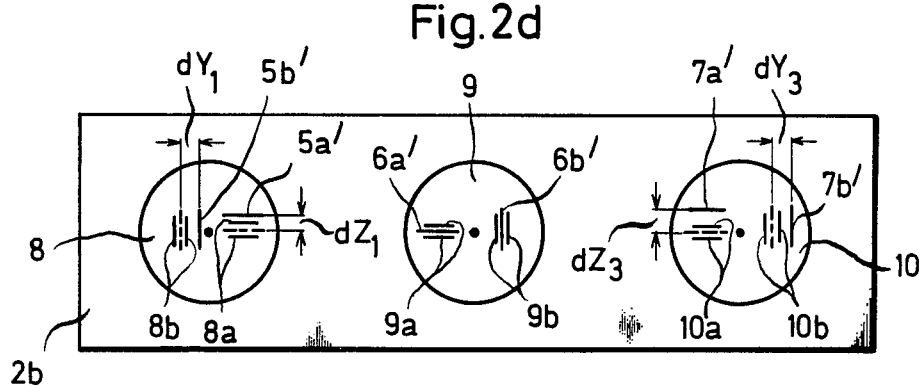

If the relative positions of slide 1 and guide bed or ways 2 (FIG. 1) are initially set by means of known adjusting means (now shown), while observing the reproduction of the pickup-marks 6 over the afocal imaging system 15 on the receiver-mark system 9 (as a direction coordinator) such that the reproduced marks $6a'$ and $6b'$ are captured symmetrically by the double-line marks 9a and 9b, as represented in FIG. 2d, thus reducing $dY_2$ and $dZ_2$ to zero (FIG. 2c), then slide 1 will have been set parallel to the reference lines 11-12-13 (FIG. 1). Any remaining deviations $dY_1$-$dY_3$ and $dZ_1$-$dZ_3$ of the mark images $5a'$-$7a'$ and $5b'$-$7b'$, respectively, from the symmetrical capturing position represented by broken lines in FIG. 2c then indicate the parallel offset disposition of the associated afocal systems 14 and 16, which work now as pure position discriminators. Different amounts of the quantities $dZ_1$-$dZ_2$ indicate also that slide 1 is tilted about the optical axis of the central afocal imaging system 15 (see FIG. 1).

Instead of line marks as shown at 5-6-7 and 8-9-10 in FIGS. 2a and 2b, scales 5c–5d (FIG. 3a) and index marks 8c–8d (FIG. 3b) may be used to provide an analog reading of the measured values; alternatively, rasters 7c–7d and counter-rasters 10c–10d may be employed for a digital determination of measured error values.

Figure 3A:
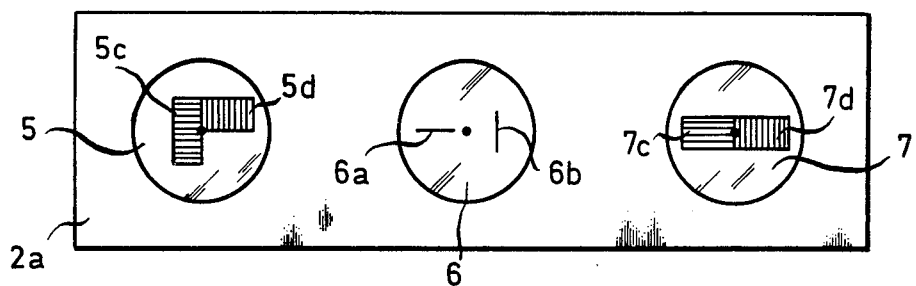
Figure 3B:
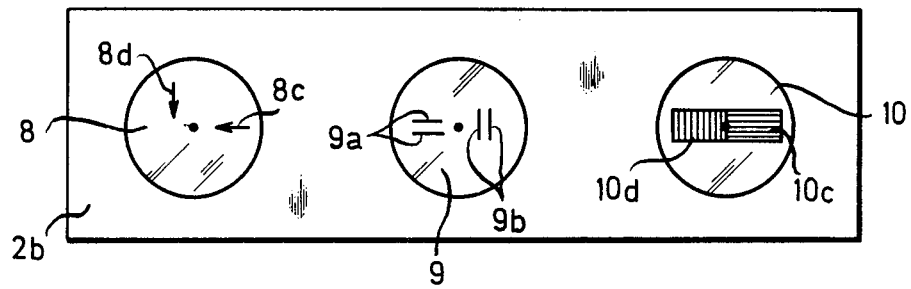

Moreover, such different mark systems can also be combined, as is represented, for example, in FIGS. 3a and 3b. And, the mark setting can also be viewed visually by optical auxiliary means or scanned by known photoelectric receiver systems and processed electronically, for example, for the control of adjusting means for the relative adjustment of the slide and its guide.

Such feedback use of an error signal derived by the invention is suggested in connection with FIG. 1, wherein separate light sources S back-light the translucent pickup-mark systems 5-6-7 (e.g., FIG. 2a), and wherein the receiver-mark systems 8-9-10 include inscribed translucent masks (e.g., FIG. 2b) and photoelectric scanning means unique to each error-component deviation (e.g., $dY_2$, in FIG. 2c) to be observed; the electrical-signal output of such scanning is suggested by a full-line arrow output from system 9, and similar outputs will be understood for each of the other error-component signal derivations at 8-9-10. The error signal may be processed at amplifier means 17 to drive a motor, shown connected by means 18 to a lead-screwdrive, for positioning adjustable wedge or gib means 19, for such bodily lateral displacement of slide 1 (as suggested by spaced connections 20) as will produce a reduction of error component $dY_2$ to zero; similar drives, signal conditioning, and corrective slide-positioning devices will be understood to be provided, as appropriate, for analogous reduction to zero of each of the other error-component signals $dY_1$-$dY_3$-$dZ_1$-$dZ_2$-$dZ_3$ detected at 8-9-10.

Figure 4:
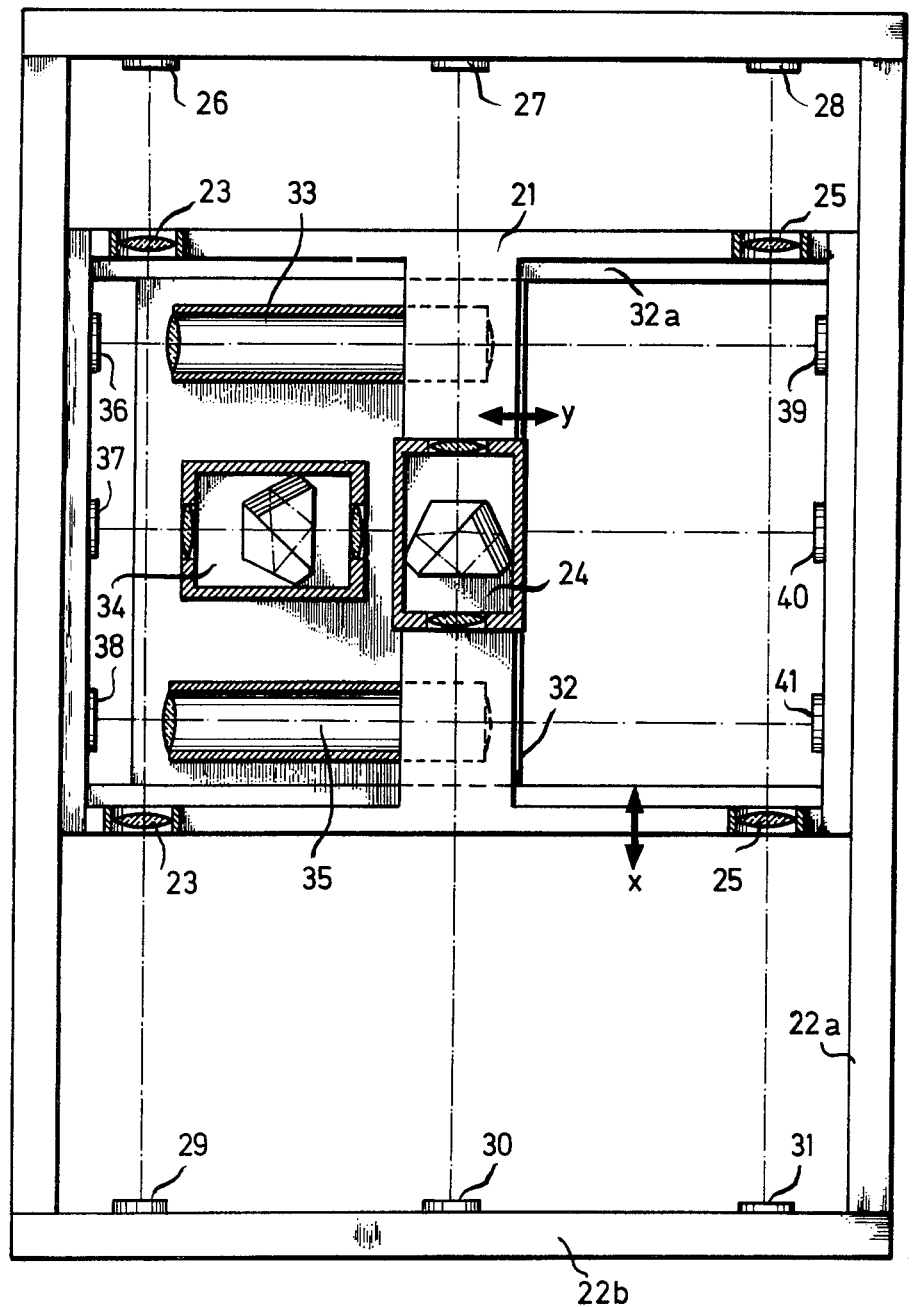
FIG. 4 is a view similar to FIG. 1 to illustrate a cross-slide application of the invention.

The method which has been described thus far only for a longitudinal slide can also be used in a similar manner for coordinate compound-motion positioning tables, whether they are built on the principle of crossed slides, for which no special representation is required, or on the principle of a cross-slide, for which FIG. 4 represents a schematic example.

In FIG. 4, the slide 21, the guide frame 22a-22b, and the afocal imaging systems 23-24-25 form, with the associated mark systems 26-27-28 and 29-30-31, respectively, a device similar to the arrangement of FIG. 1, except that slide 21 additionally provides guide means 32a for movement of slide 32 in a direction perpendicular to that of slide 21. Slide 32 similarly contains two afocal imaging systems 33-35 with an image scale $\beta' = -1$, and an afocal imaging system 34 with the image scale $\beta' = +1$; these systems image or reproduce the pickup-mark systems 36-37-38 (carried by one end slide 21) at the receiver-mark systems 39-40-41 (carried at the other end of slide 21). Aside from its orientation, this second superposed (piggy-back) arrangement is similar in design and operation to that described in connection with FIG. 1.

Figure 5:
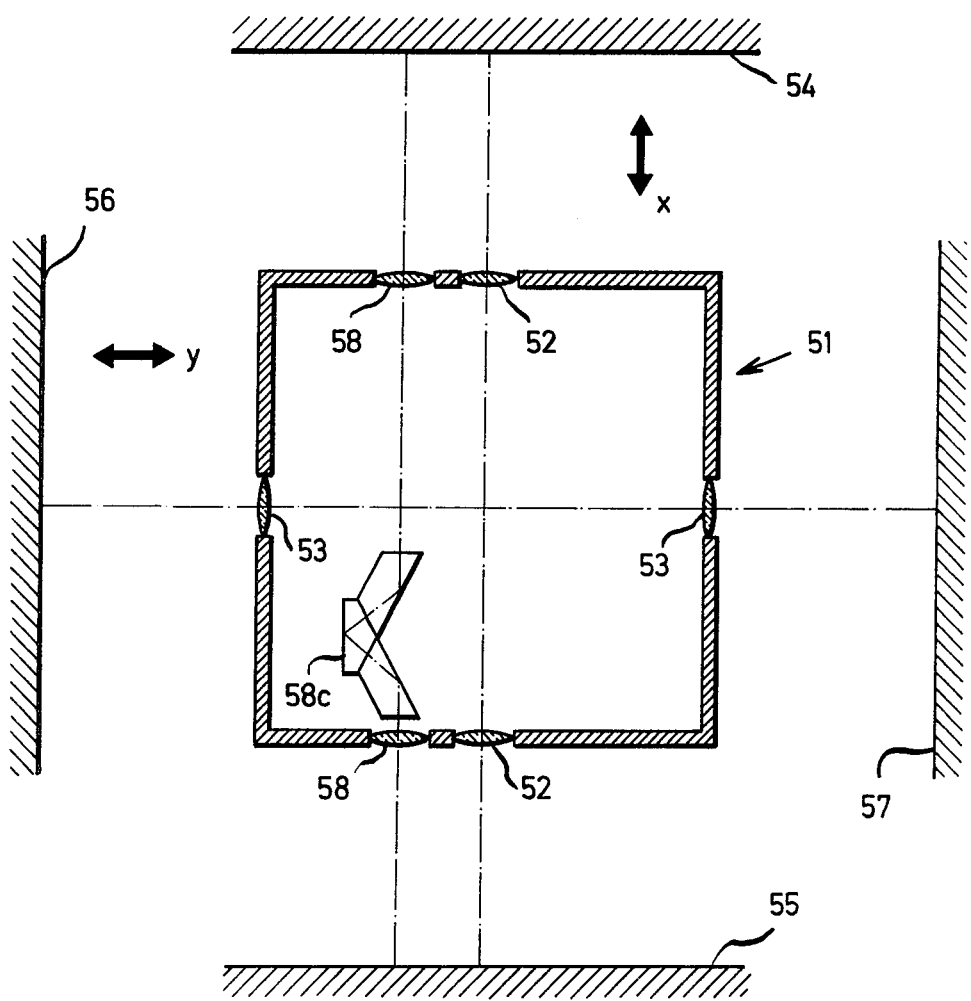
FIGS. 5 and 6 are schematic representations of further embodiments.
Figure 6:
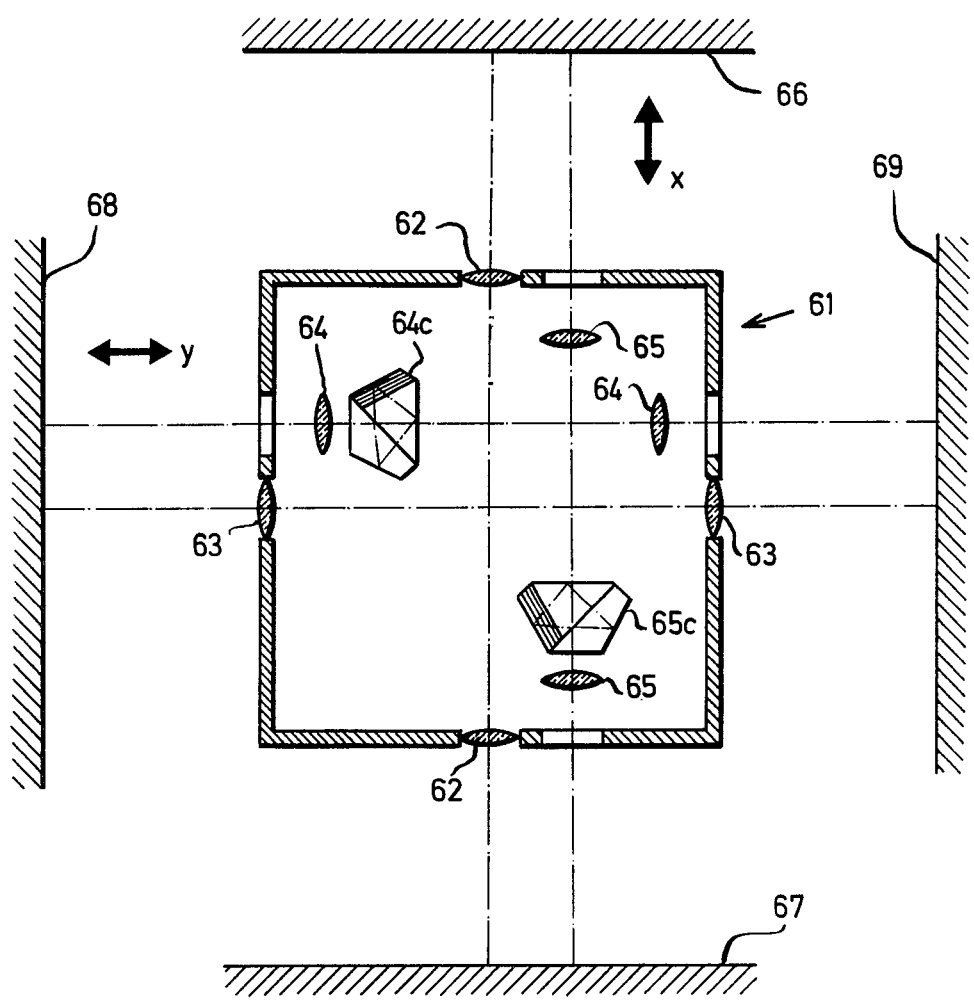

The invention also contemplates, inter alia, the additional implementation of a known device (see Optik, 28, 1968/69, pp. 242-248) with direction discriminators employing afocal imaging systems with an image scale of $\beta' = +1$, as illustrated by FIGS. 5 and 6.

In the schematic representation of FIG. 5, a slide 51 is movable in two coordinate orthogonally related directions $x$-$y$, in or parallel to the drawing plane; this plane contains two intersecting afocal imaging systems 52-53 with the image scale $\beta' = -1$, by means of which suitably marked and coordinated scales at 54-55 and 56-57, and fixedly referenced to the machine bed, are reproduced on one another.

According to the invention, this known arrangement is equipped additionally with an afocal imaging system 58 with the image scale $\beta' = +1$, which contains an image-erecting (i.e., non-inverting) prism 58c. This additional afocal imaging system serves as a direction (i.e., orientation) discriminator in a plane offset from and parallel to the drawing plane.

Additional measures are required to recognize vertical and lateral components of tilt (if any) of the slide about its longitudinal ($x$) or transverse ($y$) axis, as well as any offsetting displacement in the vertical direction, perpendicular to the drawing plane. To this end, an additional afocal imaging system 64-65 (with an image scale $\beta' = +1$) is installed next to each afocal imaging system 62-63 (with an image scale $\beta' = -1$), as represented, for example, in FIG. 6. The latter contain image-erecting prism systems 64c-65c, as of the so-called Schmidt or Pechan type.

Figure 7A:
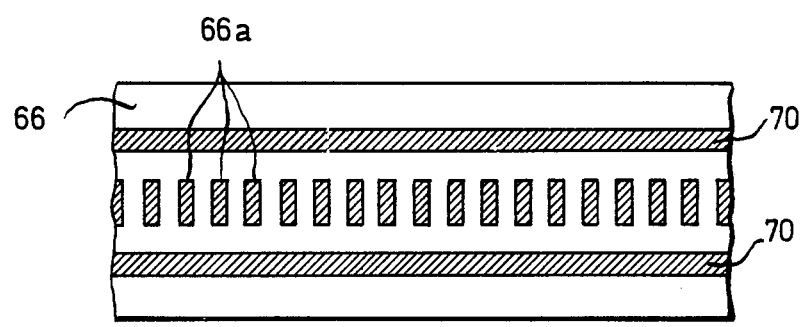
FIGS. 7a and 7b are enlarged fragmentary views of scales used in the embodiment of FIG. 6.
Figure 7B:
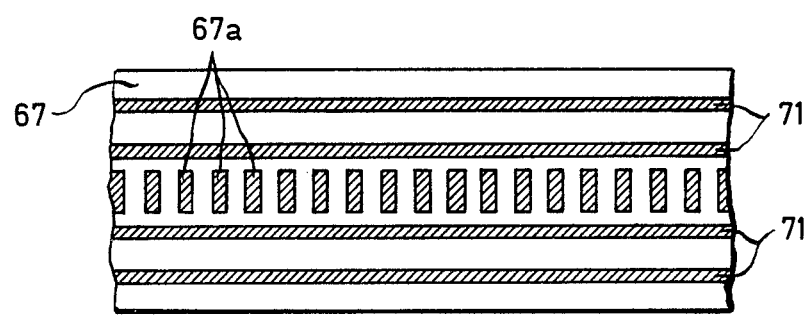

In FIG. 7a, one of the two scales or mark systems of the pairs of scales at 66-67 and 68-69, respectively reproduced on one another, is provided additionally, above and below the divisions 66a and 67a with a single elongated line 70; the other is similarly provided with double lines 71, as represented in FIGS. 7a and 7b. Scales 66-68 and 67-69, respectively, may be duplicates of each other, so that all are illustrated by the showing in FIGS. 7a and 7b of scales 66 and 67. The symmetry positions in the image plane (scales 67 and 69) again establish criteria for any stage or platform; they also establish a tilt criterion for stage displacement after alignment via the afocal systems 64-65. The latter (64-65) serve again as direction (orientation) discriminators.

If it is decided to forego a double determination of vertical displacement (e.g., offset from the plane of the drawing), the prism systems used can be simplified accordingly.

Instead of using the described single or double elongated lines, in the direction of division of the scale, further pluralities of such elongated lines may be used, for electronic evaluation in conjunction with a raster, thus enabling an additional simplification of the crossed afocal systems, due to the possibility of remotely transmitting detected error signals, for decentralized electronic evaluation. The invention is by no means limited to the embodiments shown, and many variations are possible within the framework of the invention.

To further illustrate operation of devices according to the invention, special properties of the present afocal imaging systems will be briefly discussed.

Figure 8A:
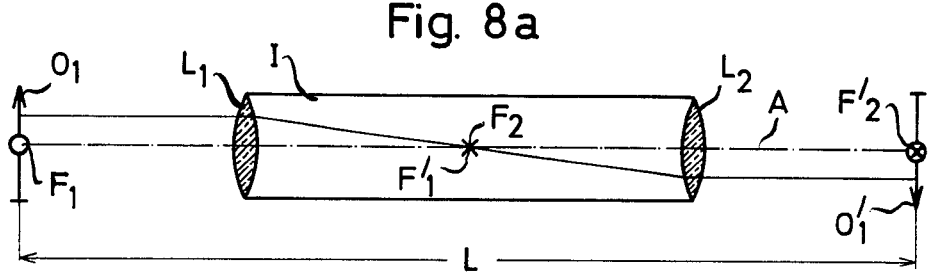
FIGS. 8a to 8d are simplified optical diagrams to illustrate an afocal image system with an image scale of $\beta' = -1$, and various uses thereof in accordance with the invention.

In FIG. 8a, an afocal imaging system with an image scale of $\beta' = -1$ is provided on an optical axis A and is seen to comprise two positive lenses $L_1$ and $L_2$ of equal focal length, mounted in a tube I and spaced such that their adjacent foci $F_1'$ and $F_2$ coincide. At their remote sides the foci $F_1$ and $F_2'$ of the lenses $L_1$ and $L_2$ are positioned at basic positions of the systems, being spaced by the object-image distance L, already identified. In this circumstance, the object $O_1$ and its image $O_1'$ are reproduced on one another in the scale 1:-1, i.e., vertically and laterally inverted.

Figure 8B:
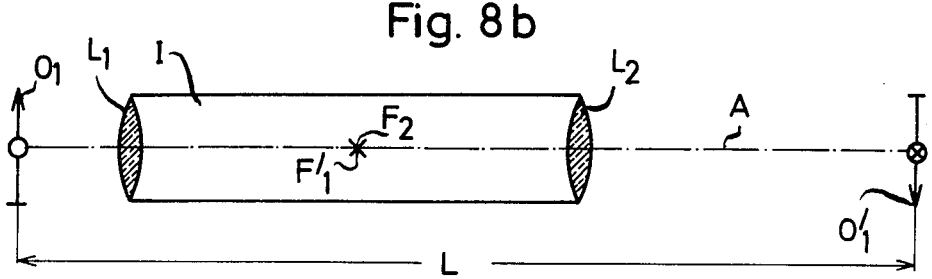

Now, if the afocal system $L_1$-$L_2$ is moved relative to the fixed object $O_1$ and solely along the optical axis A, as represented by the leftward bodily displacement of tube I from the position shown in FIG. 8a kto that shown in FIG. 8b, the image $O_1'$ of object $O_1$ and the distance L from object $O_1$ remain unchanged in size and position.

Figure 8C:
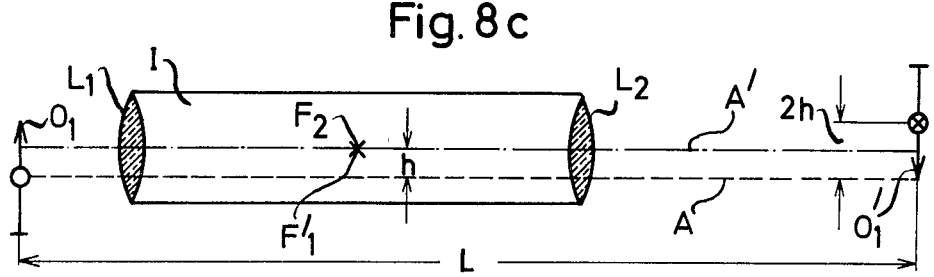

However, if the system $L_1$-$L_2$ is laterally offset (i.e., displaced parallel to itself), as represented by the offset h in FIG. 8c, so that its optical axis extends in the direction of line A', i.e., parallel to the original line A, the image $O_1'$ of the retained object $O_1$ moves away from the axis A by double the extent of the parallel offset (i.e., to the extent Zh), but maintains this offset position for each location of the system $L_1$-$L_2$ along line A'.

Figure 8D:
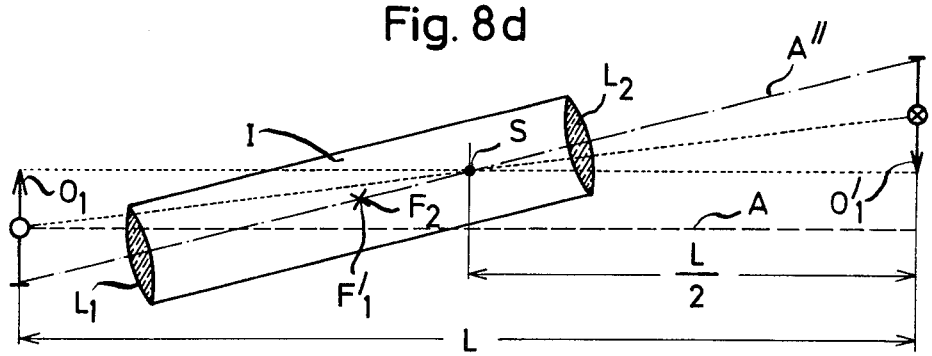

In the most general case, the system $L_1$-$L_2$ is not only displaced with respect to its original position along the line A, as represented in FIG. 8d, but is also tilted, so that its optical axis now extends, for example, in the direction of line A''. In this circumstance, the image points of object $O_1$ lie on lines which pass through the intersection S of its optical axis A'' with a plane which is assumed at a distance L/2 away from and parallel to the image plane.

Figure 9A:
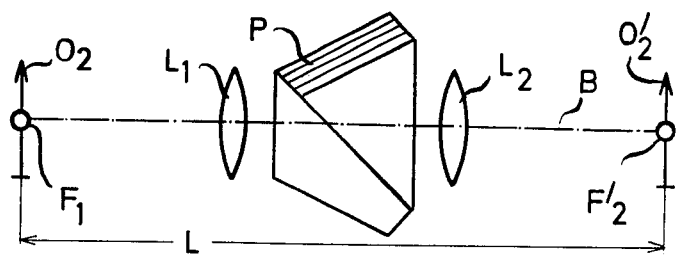
FIGS. 9a to 9c are similar optical diagrams to illustrate an afocal image system with an image scale of $\beta' = +1$, and various uses thereof in accordance with the invention.

The afocal imaging system with an image scale of $\beta' = +1$, as represented in FIG. 9a, differs from the system of FIG. 8a by addition of an image-erecting prism system P between the lenses $L_1$ and $L_2$; a so-called Schmidt or Pechan system serves to illustrate the system P. The reproduction of object $O_2$ at image $O_2'$, in the distance L, is effected in the scale 1:1. And the image of object $O_2$ is seen to be vertically and laterally uninverted.

Figure 9B:
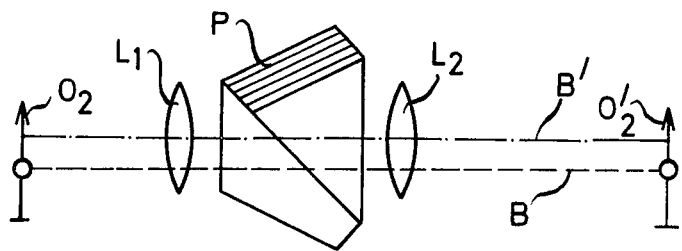
Figure 9C:
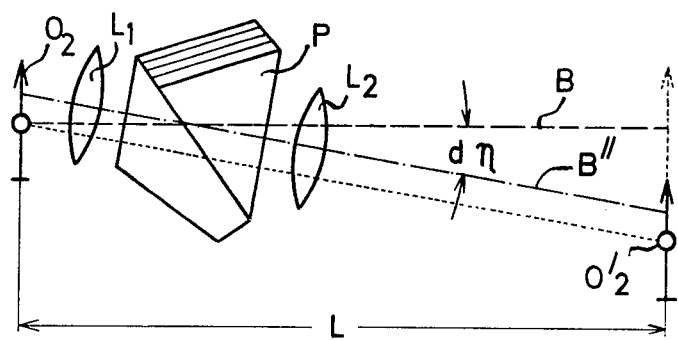

With a parallel offsetting displacement of the system $L_1$-P-$L_2$ of FIG. 9b, the image $O_2'$ remains unchanged in size and position, regardless of the extent of pure axial displacement along its optical axis A'. For a directional (i.e., orientation) change of the system $L_1$-P-$L_2$, as by tiling its optical axis to the extent $d\eta$ from position A into position A'' (FIG. 9b), an image displacement takes place which depends only on the size of the change of direction $d\eta$ and on the size of the object-image distance L. The various image points lie on lines parallel to the optical axis A''.

The relation between error values determined with the devices according to the invention, in terms of the actual position of the moving part, will be described in the context of a longitudinal slide system according to FIG. 1, and using the simplified three-dimensional diagram of FIG. 10.

Figure 10:
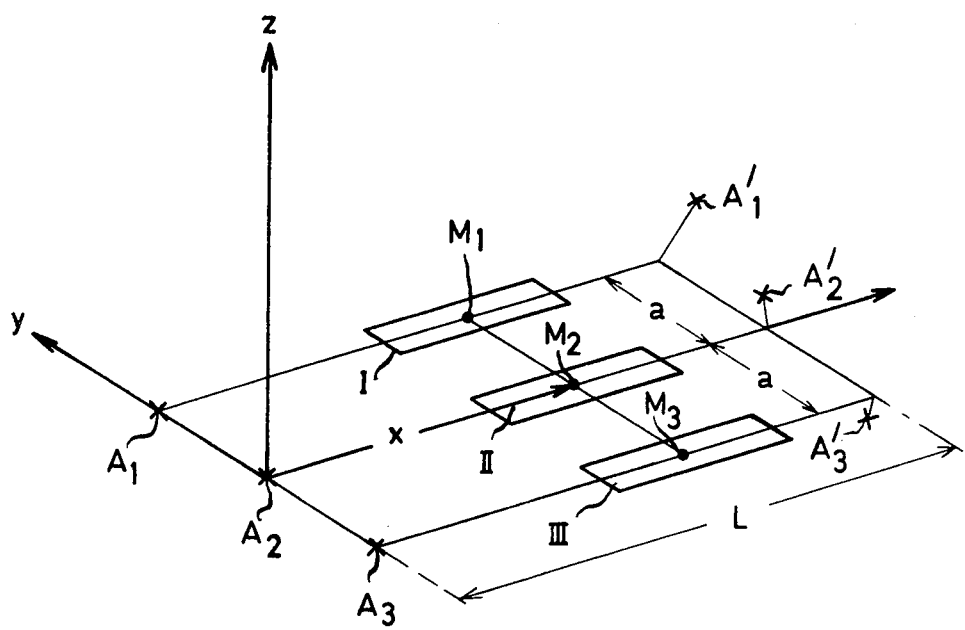
FIG. 10 is a simplified three-dimensional diagram to assist in explaining operational use of the embodiment of FIG. 1.

FIG. 10 depicts a longitudinal slide system, in which reference numerals I and III denote afocal systems imaging with an image scale of $\beta' = -1$ (for example, according to FIG. 8a) and reference numeral II denotes an afocal system imaging with an image scale of $\beta' = +1$ (for example, according to FIG. 9a). The centers of these systems are identified $M_1$-$M_2$-$M_3$, respectively, at uniform lateral spacings a.

For simplicity, the reference coordinate system x-y-z fixed in the guide bed has been so arranged that the x-axis represents the reference axis for the central system II, and so that the pickup marks $A_1$-$A_2$-$A_3$ are disposed on the y-axis. The coordinate representation is thus for the marks $A_1 (O\ a\ ))$ $A_2 (0\ 0\ 0)$ $A_3 (0\ -a\ 0)$ and for the images of these marks projected on the plane of the receiver marks (i.e., where $x = L$):

$A'_1 (L\ a+dY_1\ dZ_1)$ $A'_2 (L\ dY_2\ dZ_2)$ $A'_3 (L\ -a+dY_3\ dZ_3)$

It will be recalled that at this receiver-mark plane, the various error-value components dY-dZ are indicated, as noted in FIG. 2c.

From the indicated error-component values can be calculated, for example, the displacement components (dy, dz) of the center $M_2$ (of the central system II in FIG. 10), as well as the rotational vector $\bar{D}$ (with components $D_1$-$D_2$-$D_3$) which indicates the direction and amount of any tilt rotation or departure of the slide axis from its frame-referenced alignment.

Let it be assumed that the rotational vector $\bar{D}$ acts at the center $M_2$ and that its components $D_1$-$D_2$-$D_3$ are rotations about axes parallel to the coordinate directions x-y-z. Under these circumstances, any offset displacement or rotational misalignment is ascertained as a function of the indicated error-component values, as follows:

$$dy = \frac{1}{4}(dY_1 + dY_3) - \frac{1}{L}\left(\frac{L}{2} - x\right) \cdot dY_2$$

$$dz = \frac{1}{4}(dZ_1 + dZ_3) - \frac{1}{L}\left(\frac{L}{2} - x\right) \cdot dZ_2$$

$$D_1 = \frac{1}{4a}(dZ_1 - dZ_3)$$

$$D_2 = -\frac{1}{L}dZ_2$$

$$D_3 = \frac{1}{L}dY_2$$

What is claimed is:

1. In combination, a relatively fixed body and a movable body having guided coaction with said fixed body for displacement between spaced points on said fixed body and along a given axis with respect thereto, optical means on said fixed body establishing between said spaced points an optical-axis reference for the precise alignment of said given axis, first discriminator means including a first afocal optical system operative on said optical-axis reference and carried by said movable body for sensing lateral error deviation of said element with respect to said axis, and second discriminator means including a second afocal optical system operative on said optical-axis reference and carried by said movable body for sensing directional tilting error deviation of said second element with respect to said axis, said afocal optical systems having imaging characteristics $\beta' = +1$ and $\beta' = -1$, respectively.

2. The combination of claim 1, wherein said first and second elements are on spaced parallel optical-reference axes, each of which is parallel to said given axis and is established between spaced points on said fixed body.

3. The combination of claim 2, in which a characteristic mark system is located at each of the fixed points for each of said parallel optical-reference axes, the afocal systems carried by said movable body being aligned unique to a different one of said axes, whereby the mark systems at the fixed-body reference points of each axis are imaged upon one another.

4. The combination of claim 3, in which the mark system at one fixed-body reference end of one of said axes includes means responsive to deviation between a locally inscribed mark and the corresponding projected mark for deriving an electrical error-signal output.

5. The combination of claim 1, in which said optical-axis reference comprises three parallel fixed-body axes established in a given plane, and in which two afocal imaging systems of imaging characteristic $\beta' = -1$ are disposed in equally spaced relation on opposite sides of a third afocal imaging system of imaging characteristic $\beta' = +1$.

6. The combination of claim 1, in which the afocal imaging system with the imaging characteristic $\beta' = +1$ contains an image-erecting prism.

7. The combination of claim 3, in which the mark systems consist of graticules with lines extending in perpendicular relation in planes normal to the said optical-reference axes.

8. The combination of claim 7, in which for at least one of said axes the mark system at one fixed-body end is characterized by single-line markings and the mark system at the other fixed-body end is characterized by double-line markings.

9. The combination of claim 7, in which for at least one of said axes the mark system at one fixed-body end is characterized by scale graduations and the mark system at the other fixed-body end is characterized by an index mark.

10. The combination of claim 7, in which for at least one of said axes the mark system at one fixed-body end is characterized by raster markings.

11. The combination of claim 4, and including corrective drive means responsive to said electrical error-signal output and connected to impart a repositioning displacement component to said movable body in the sense opposed to the direction of the detected error component, whereby said drive means is operative to reduce the detected error-signal output to zero.

12. In combination, a relatively fixed body and a movable body having guided coaction for displacement of said movable body between spaced longitudinal parts of said fixed body and along a given axis with respect thereto; first discriminator means including means on said spaced parts of said fixed body establishing a first fixed optical axis parallel to said given axis, and a first afocal optical system carried by said moving body and substantially centered on said first fixed optical axis; second discriminator means including means on said spaced parts of said fixed body establishing a second fixed optical axis parallel to said given axis, and a second afocal optical system carried by said moving body and substantially centered on said second fixed optical axis; said afocal systems having imaging characteristics $\beta' = +1$ and $\beta' = -1$, respectively.

13. The combination of claim 12, in which said movable body is a main slide, and in which a cross slide has guided coaction with said main slide for displacement between transversely spaced parts of said main slide and in a transverse axial component of direction; third discriminator means including means on said transversely spaced parts of said main slide establishing a first transverse optical axis parallel to said axial component of direction, and a third afocal optical system carried by said cross slide and substantially centered on said first transverse optical axis; fourth discriminator means including means on said transversely spaced parts of said main slide establishing a second transverse optical axis parallel to said axial component of direction, and a fourth afocal optical system carried by said cross slide and substantially centered on said second transverse optical axis; said last two afocal systems having imaging characteristics $\beta' = +1$ and $\beta' = -1$, respectively.

14. In combination, a relatively fixed body and a movable body having guided coaction for two-coordinate displacement of said movable body between first spaced parts of said fixed body in a first-coordinate direction with respect thereto, said guided displacement being also between second spaced parts of said fixed body in a second-coordinate direction orthogonal to said first-coordinate direction; first discriminator means including means on said first-spaced parts of said fixed body establishing a first fixed optical-axis reference parallel to said first-coordinate direction, and a first afocal optical system carried by said moving body and substantially on said first fixed optical-axis reference; second discriminator means including means on said first spaced parts of said fixed body establishing a second fixed optical-axis reference parallel to said first-coordinate direction, and a second afocal optical system carried by said moving body and substantially on said second fixed optical-axis reference; third discriminator means including means on said second spaced parts of said fixed body establishing a third fixed optical-axis reference parallel to said second-coordinate direction, and a third afocal optical system carried by said moving body and substantially on said third fixed optical-axis reference; said first and second afocal systems having imaging characteristics $\beta' = +1$ and $\beta' = -1$, respectively.

15. The combination of claim 14, in which said third afocal system has the imaging characteristic $\beta' = -1$.

16. The combination of claim 14, additionally including fourth discriminator means including means on said second spaced parts of said fixed body establishing a fourth fixed optical-axis reference parallel to said second-coordinate direction, and a fourth afocal optical system carried by said moving body and substantially on said fourth fixed optical-axis reference; said third and fourth afocal systems having imaging characteristics $\beta' = +1$ and $\beta' = -1$, respectively.

17. The combination of claim 14, in which each of the first spaced parts serving said first and second optical-axis references includes a scale with equally spaced like graduations.

18. The combination of claim 17, in which the scale graduations additionally include elongate lines parallel to the plane of two-coordinate movement.

* * * * *